US012684502B2

(12) United States Patent     (10) Patent No.: US 12,684,502 B2
Laselva et al.     (45) Date of Patent: Jul. 14, 2026

(54) TRANSMIT POWER CHANGE INDICATION

(71) Applicant: Nokia Technologies Oy, Espoo (FI)

(72) Inventors: Daniela Laselva, Aalborg (DK); Amol Dhere, Aalborg (DK); Knud Knudsen, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 326 days.

(21) Appl. No.: 18/582,763

(22) Filed: Feb. 21, 2024

(65) Prior Publication Data

US 2024/0340809 A1     Oct. 10, 2024

Related U.S. Application Data

(60) Provisional application No. 63/494,394, filed on Apr. 5, 2023.

(51) Int. Cl.
    *H04W 52/36*     (2009.01)
(52) U.S. Cl.
    CPC ................................. *H04W 52/367* (2013.01)
(58) Field of Classification Search
    CPC . H04W 52/367; H04W 52/143; H04W 52/52; H04W 52/54
    See application file for complete search history.

(56) References Cited

U.S. PATENT DOCUMENTS

| | | | |
|---|---|---|---|
| 9,955,374 B2 | 4/2018 | Nammi et al. | |
| 10,211,960 B2 | 2/2019 | Davydov et al. | |
| 11,611,939 B2 | 3/2023 | Davydov et al. | |
| 2021/0211981 A1* | 7/2021 | Greenberger | ..... H04W 52/0225 |
| 2023/0019892 A1* | 1/2023 | Gordaychik | .......... H04W 52/58 |
| 2023/0209463 A1* | 6/2023 | Shih | .................. H04W 52/0216 |
| | | | 370/311 |

FOREIGN PATENT DOCUMENTS

| | | |
|---|---|---|
| EP | 2874447 A1 | 5/2015 |
| EP | 4064600 A1 | 9/2022 |
| WO | 2021/044636 A1 | 3/2021 |

OTHER PUBLICATIONS

Extended European Search Report received for corresponding European Patent Application No. 24155893.1, dated Jul. 25, 2024, 6 pages.
"New WID: Network energy savings for NR", 3GPP TSG RAN Meeting #98-e, RP-223540, Agenda: 9.1.1, Huawei, Dec. 12-16, 2022, pp. 1-6.
"3rd Generation Partnership Project, Technical Specification Group Radio Access Network; Study on network energy savings for NR (Release 18)", 3GPP TR 38.864, V18.1.0, Mar. 2023, pp. 1-72.
"Techniques in spatial and power domains", 3GPP TSG RAN WG1 #112, R1-2301425, Agenda: 9.7.1, Qualcomm Incorporated, Feb. 27-Mar. 3, 2023, 17 pages.

(Continued)

*Primary Examiner* — Curtis A Kuntz
(74) *Attorney, Agent, or Firm* — Barta Jones, PLLC

(57) ABSTRACT

There is provided a method performed by a first device, the method comprising: determining whether or not a change indication from a second device is preferred when transmit power at the second device changes in a transmission to the first device; and providing to the second device, information of whether or not the change indication is preferred.

20 Claims, 6 Drawing Sheets

(56)               References Cited

OTHER PUBLICATIONS

"Techniques in Spatial and Power Domains", 3GPP TSG RAN WG1 Meeting #112bis-e, R1-2302393, Agenda: 9.7.1, Nokia, Apr. 17-26, 2023, 24 pages.

"3rd Generation Partnership Project; Technical Specification Group Radio Access Network; NR; Radio Resource Control (RRC) protocol specification (Release 17)", 3GPP TS 38.331, V17.4.0, Mar. 2023, pp. 1-1324.

"Summary #2 for email discussion on energy saving techniques of NW energy saving SI", 3GPP TSG RAN WG1 Meeting #109-e, R1-2205533, Agenda: 9.7.2, Intel Corporation, May 9-20, 2022, 147 pages.

"Discussion Summary #3 for energy saving techniques of NW energy saving SI", 3GPP TSG RAN WG1 Meeting #111, R1-2212779, Agenda: 9.7.2, Intel Corporation, Nov. 14-18, 2022, 202 pages.

"IEEE 802.11", Wikipedia, Retrieved on Feb. 16, 2024, Webpage available at : https://en.wikipedia.org/wiki/IEEE_802.11.

* cited by examiner

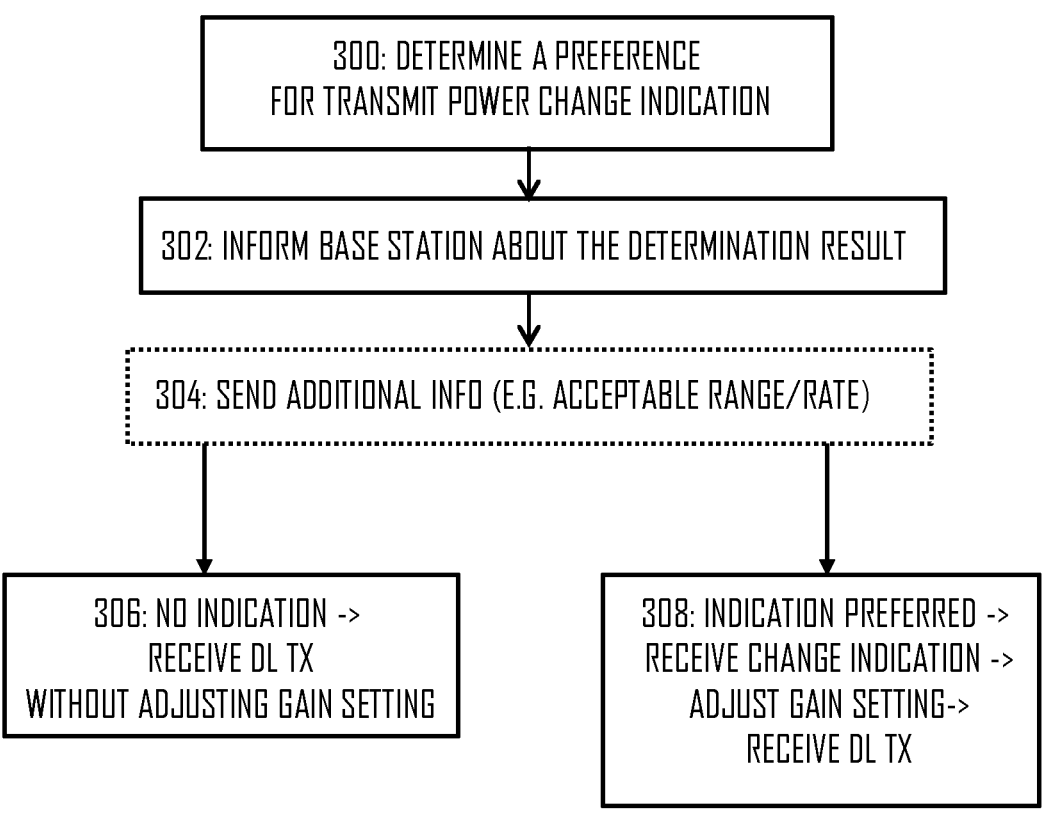

300: DETERMINE A PREFERENCE
FOR TRANSMIT POWER CHANGE INDICATION

302: INFORM BASE STATION ABOUT THE DETERMINATION RESULT

304: SEND ADDITIONAL INFO (E.G. ACCEPTABLE RANGE/RATE)

306: NO INDICATION ->
RECEIVE DL TX
WITHOUT ADJUSTING GAIN SETTING

308: INDICATION PREFERRED ->
RECEIVE CHANGE INDICATION ->
ADJUST GAIN SETTING->
RECEIVE DL TX

FIG. 3

UPPER LIMIT (X)

DEFAULT TX POWER

LOWER LIMIT (Y)

TX POWER AT GNB

TIME 400    402    404    406    408    410

FIG. 4A

TRANSMIT POWER CHANGE INDICATION

RELATED APPLICATIONS

This application claims priority of a U.S. provisional patent application No. 63/494,394, filed on Apr. 5, 2023, which is hereby incorporated in its entirety.

TECHNICAL FIELD

Various example embodiments relate generally to energy saving, and more particularly to changes in transmit power.

BACKGROUND

It is common that transmit power may need to be changed between transmissions. This may be performed as part of energy saving procedures, for example. How the receiving party manages such changes may be problematic.

BRIEF DESCRIPTION

According to some aspects, there is provided the subject matter of the independent claims. Some further aspects are defined in the dependent claims.

LIST OF THE DRAWINGS

In the following, the invention will be described in greater detail with reference to the embodiments and the accompanying drawings, in which FIG. 1 presents a network, according to an embodiment;

FIGS. 4A, 4B and 4C show example of acceptable range or rate, according to some embodiments;

FIGS. 3 and 5 show methods, according to some embodiments;

DESCRIPTION OF EMBODIMENTS

Figure 1:
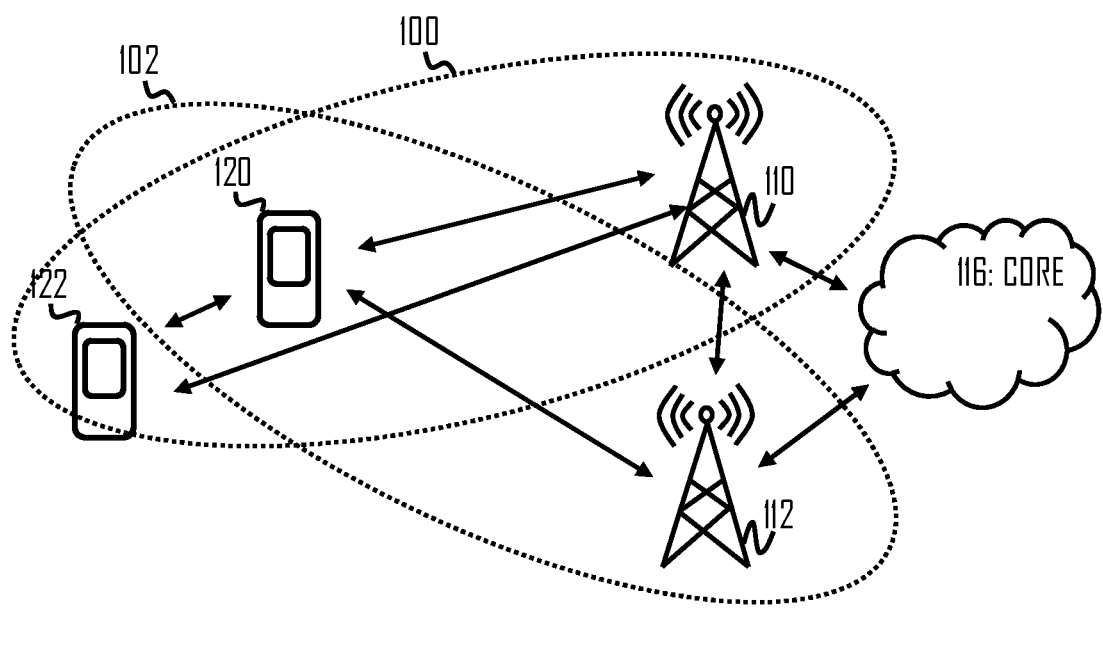

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments. For the purposes of the present disclosure, the phrases "at least one of A or B", "at least one of A and B", "A and/or B" means (A), (B), or (A and B). For the purposes of the present disclosure, the phrases "A or B" and "A and/or B" means (A), (B), or (A and B). For the purposes of the present disclosure, the phrase "A, B, and/or C" means (A), (B), (C), (A and B), (A and C), (B and C), or (A, B, and C).

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments.

Embodiments described may be implemented in a radio system, such as one comprising at least one of the following radio access technologies (RATs): Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, and enhanced LTE (eLTE). Term 'eLTE' here denotes the LTE evolution that connects to a 5G core. LTE is also known as evolved UMTS terrestrial radio access (EUTRA) or as evolved UMTS terrestrial radio access network (EUTRAN). A term "resource" may refer to radio resources, such as a physical resource block (PRB), a radio frame, a subframe, a time slot, a subband, a frequency region, a sub-carrier, a beam, etc. The term "transmission" and/or "reception" may refer to wirelessly transmitting and/or receiving via a wireless propagation channel on radio resources The embodiments are not, however, restricted to the systems/RATs given as an example but a person skilled in the art may apply the solution to other communication systems provided with necessary properties. One example of a suitable communications system is the 5G system or future 6G system. The 3GPP solution to 5G is referred to as New Radio (NR). 5G has been envisaged to use multiple-input-multiple-output (MIMO) multi-antenna transmission techniques, more base stations or nodes than the current network deployments of LTE (a so-called small cell concept), including macro sites operating in co-operation with smaller local area access nodes and perhaps also employing a variety of radio technologies for better coverage and enhanced data rates. 5G will likely be comprised of more than one radio access technology/radio access network (RAT/RAN), each optimized for certain use cases and/or spectrum. 5G mobile communications may have a wider range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and being integrable with existing legacy radio access technologies, such as the LTE.

The current architecture in LTE networks is distributed in the radio and centralized in the core network. The low latency applications and services in 5G may require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications). Edge cloud may be brought into RAN by utilizing network function virtualization (NVF) and software defined networking (SDN). Using edge cloud may mean access node operations to be carried out, at least partly, in a server, host or node operationally coupled to a remote radio head or base station comprising radio parts. Network slicing allows multiple virtual networks to be created on top of a common shared physical infrastructure. The virtual networks are then customised to meet the specific needs of applications, services, devices, customers or operators.

In radio communications, node operations may in be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of work between core network operations and base station operations may vary depending on implementation. Thus, 5G networks architecture may be based on a so-called CU-DU split. One gNB-CU controls several gNB-DUs. The term 'gNB' may correspond in 5G to the eNB in LTE. The gNBs (one or more) may communicate with one or more UEs. The gNB-CU (central node) may control a plurality of spatially separated gNB-DUs, acting at least as transmit/receive (Tx/Rx) nodes. In some embodiments, however, the gNB-DUs (also called DU) may comprise e.g. a radio link control (RLC), medium access control (MAC) layer and a physical (PHY) layer, whereas the gNB-CU (also called a CU) may comprise the layers above RLC layer, such as a packet data convergence protocol (PDCP) layer, a radio resource control (RRC) and an internet protocol (IP) layers. Other functional splits are possible too. It is considered that skilled person is familiar with the OSI model and the functionalities within each layer.

In an embodiment, the server or CU may generate a virtual network through which the server communicates with the radio node. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Some other technology advancements probably to be used are Software-Defined Networking (SDN), Big Data, and all-IP, to mention only a few non-limiting examples. For example, network slicing may be a form of virtual network architecture using the same principles behind software defined networking (SDN) and network functions virtualisation (NFV) in fixed networks. SDN and NFV may deliver greater network flexibility by allowing traditional network architectures to be partitioned into virtual elements that can be linked (also through software). Network slicing allows multiple virtual networks to be created on top of a common shared physical infrastructure. The virtual networks are then customised to meet the specific needs of applications, services, devices, customers or operators.

The plurality of gNBs (access points/nodes), each comprising the CU and one or more DUs, may be connected to each other via the Xn interface over which the gNBs may negotiate. The gNBs may also be connected over next generation (NG) interfaces to a 5G core network (5GC), which may be a 5G equivalent for the core network of LTE. Such 5G CU-DU split architecture may be implemented using cloud/server so that the CU having higher layers locates in the cloud and the DU is closer to or comprises actual radio and antenna unit. There are similar plans ongoing for LTE/LTE-A/eLTE as well. When both eLTE and 5G will use similar architecture in a same cloud hardware (HW), the next step may be to combine software (SW) so that one common SW controls both radio access networks/technologies (RAN/RAT). This may allow then new ways to control radio resources of both RANs. Furthermore, it may be possible to have configurations where the full protocol stack is controlled by the same HW and handled by the same radio unit as the CU.

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future rail-way/maritime/aeronautical communications. Satellite communication may utilize geo-stationary earth orbit (GEO) satellite systems, but also low earth orbit (LEO) satellite systems, in particular mega-constellations (systems in which hundreds of (nano) satellites are deployed). Each satellite in the mega-constellation may cover several satellite-enabled network entities that create on-ground cells. The on-ground cells may be created through an on-ground relay node or by a gNB located on-ground or in a satellite.

The embodiments may be also applicable to narrow-band (NB) Internet-of-things (IoT) systems which may enable a wide range of devices and services to be connected using cellular telecommunications bands. NB-IoT is a narrowband radio technology designed for the Internet of Things (IoT) and is one of technologies standardized by the 3rd Generation Partnership Project (3GPP). Other 3GPP IoT technologies also suitable to implement the embodiments include machine type communication (MTC) and eMTC (enhanced Machine-Type Communication). NB-IoT focuses specifically on low cost, long battery life, and enabling a large number of connected devices. The NB-IoT technology is deployed "in-band" in spectrum allocated to Long Term Evolution (LTE)—using resource blocks within a normal LTE carrier, or in the unused resource blocks within a LTE carrier's guard—band-or "standalone" for deployments in dedicated spectrum.

The embodiments may be also applicable to device-to-device (D2D), machine-to-machine, peer-to-peer (P2P) communications. The embodiments may be also applicable to vehicle-to-vehicle (V2V), vehicle-to-infrastructure (V2I), infrastructure-to-vehicle (I2V), or in general to V2X or X2V communications.

FIG. 1 illustrates an example of a communication system to which embodiments of the invention may be applied. The system may comprise a control node 110 providing one or more cells, such as cell 100, and a control node 112 providing one or more other cells, such as cell 102. Each cell may be, e.g., a macro cell, a micro cell, femto, or a pico cell, for example. In another point of view, the cell may define a coverage area or a service area of the corresponding access node. The control node 110, 112 may be an evolved Node B (eNB) as in the LTE and LTE-A, ng-eNB as in eLTE, gNB of 5G, or any other apparatus capable of controlling radio communication and managing radio resources within a cell. The control node 110, 112 may be called a base station, network node, or an access node.

The system may be a cellular communication system composed of a radio access network of access nodes, each controlling a respective cell or cells. The access node 110 may provide user equipment (UE) 120 (one or more UEs) with wireless access to other networks such as the Internet. The wireless access may comprise downlink (DL) communication from the control node to the UE 120 and uplink (UL) communication from the UE 120 to the control node.

Additionally, although not shown, one or more local area access nodes may be arranged such that a cell provided by the local area access node at least partially overlaps the cell of the access node 110 and/or 112. The local area access node may provide wireless access within a sub-cell. Examples of the sub-cell may include a micro, pico and/or femto cell. Typically, the sub-cell provides a hot spot within a macro cell. The operation of the local area access node may be controlled by an access node under whose control area the sub-cell is provided. In general, the control node for the small cell may be likewise called a base station, network node, or an access node.

There may be a plurality of UEs 120, 122 in the system. Each of them may be served by the same or by different control nodes 110, 112. The UEs 120, 122 may communicate with each other, in case D2D communication interface is established between them.

The term "terminal device" or "UE" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

In the case of multiple access nodes in the communication network, the access nodes may be connected to each other with an interface. LTE specifications call such an interface as X2 interface. For IEEE 802.11 network (i.e. wireless local area network, WLAN, WiFi), a similar interface may be provided between access points. An interface between an LTE access point and a 5G access point, or between two 5G access points may be called Xn. Other communication methods between the access nodes may also be possible. The access nodes 110 and 112 may be further connected via another interface to a core network 116 of the cellular communication system. The LTE specifications specify the core network as an evolved packet core (EPC), and the core network may comprise a mobility management entity (MME) and a gateway node. The MME may handle mobility of terminal devices in a tracking area encompassing a plurality of cells and handle signalling connections between the terminal devices and the core network. The gateway node may handle data routing in the core network and to/from the terminal devices. The 5G specifications specify the core network as a 5G core (5GC), and there the core network may comprise e.g. an access and mobility management function (AMF) and a user plane function/gateway (UPF), to mention only a few. The AMF may handle termination of non-access stratum (NAS) signalling, NAS ciphering & integrity protection, registration management, connection management, mobility management, access authentication and authorization, security context management. The UPF node may support packet routing & forwarding, packet inspection and QoS handling, for example.

A variable gain amplifier (VGA) is often used in communications to cope with receive signals of varying amplitude while considering the constraints of the overall system design. At the receiver, the signal amplitude is usually amplified and tailored to the demodulator or Analogue-to-Digital Converter (ADC), which decodes the signal. As the optimal signal gain changes over time, typical receivers control the signal amplitude with adjustable gain stages known as variable gain amplifiers.

Figure 2:
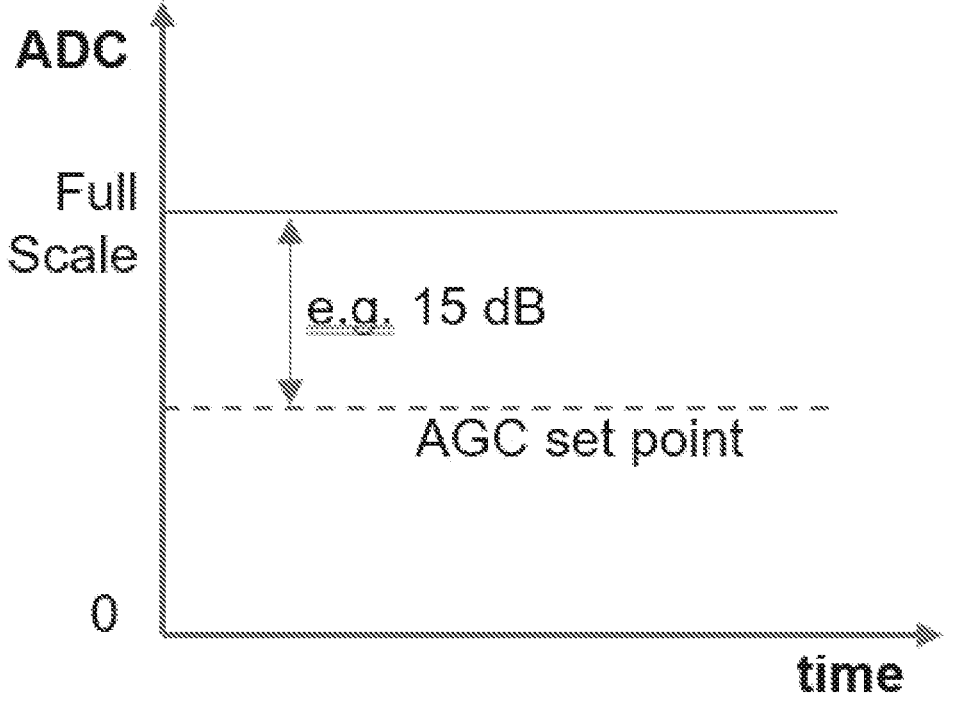
FIG. 2 shows an example of scale of analog to digital converter (ADC), adjusted by automatic gain control (AGC), according to an embodiment.

An automatic gain control (AGC) is a typical realization of VGA in 5G receivers, to automatically adjusts the signal amplitude to a set level. The AGC is a closed-loop feedback regulating circuit in an amplifier or chain of amplifiers, the purpose of which is to maintain a suitable signal amplitude at its output, despite variation of the signal amplitude at the input. Therefore, using the AGC the high dynamic range requirement of the ADC can be relaxed. FIG. 2 shows how the AGC set point may be defined with respect to the ADC's full scale.

The average or peak output signal level is used to dynamically adjust the gain of the amplifiers, enabling the circuit to work satisfactorily with a greater range of input signal levels. The ADC should support a wide radio frequency (RF) bandwidth with high resolution, which depends primarily on the order of the applied digital modulation and the performance of VGA. For example, 256-QAM needs a resolution of at least 12 bits. Furthermore, the high ADC's dynamic range needs to be maintained considering that the input signal at the receiver can vary significantly (e.g. in the range –25 dBm to –110 dBm).

The radio access network (RAN) consumes most of the total energy consumption in the network. Currently, the downlink (DL) transmission power, for example, the power spectral density per resource element (RE) or per physical resource block (PRB) is typically constant for all UEs in a cell, and equal to the maximum power. However, for the sake of network energy saving, such maximum power could be decreased altogether in certain cells. Additionally or alternatively, a more dynamic DL transmission power adaptation can be used by the network, for example, on the physical downlink shared channel (PDSCH). This means that the transmission power of the PDSCH may change dynamically, for example according to the UE channel quality such that the transmission to UEs can be performed at lower power level when UEs are located closer to the cell, and vice-versa. In other words, different power spectral densities may be used for different PRBs scheduled to different UEs. Use of lower transmit power results in much lower power consumption of the radio unit's power amplifier at the base station, and thus in network energy saving. Furthermore, in some cases, the bandwidth can be jointly adapted with the transmission power in order to better fulfil the QoS targets.

Related to the change in transmission power of the DL transmission, the UE may benefit when provided with information related to the dynamic PDSCH power change.

Currently the UE already has mechanisms to cope with relatively large changes in the received power level due to fading (e.g. by use of AGC as described above). However, the 3GPP is introducing dynamic network energy saving techniques with respect to power and spatial adaptations (for example in Release 18 and 19), which are expected to introduce even larger and abrupt power changes that the UE may not be able to cope with. There may be several reasons for this. Firstly, due to the presence in the cell of UEs at different locations, the network may have to change the PDSCH transmission power level used for a given UE very abruptly from one slot to another based on the set of UEs multiplexed in the same slot and in the same spatial direction. Secondly, the use of power adaptation in combination with spatial adaptation, where the latter results in wider beams, may increase the likelihood of multiplexing UEs at different distances from the base station.

Therefore, when the network applies dynamic changes of the power of the PDSCH transmissions, the UE's receiver might benefit by receiving some information about the power change in order to optimize its demodulation operations. The network could in principle send a transmission power change indication every time the power level is changed. However, such indication would increase the signalling overhead and, in turn, the energy consumption, which is undesired.

To at least partially tackle this problem, there is proposed a solution for an optimized signalling related to PDSCH transmission change that assists the UE's demodulation of PDSCH while minimizing signalling overhead and energy consumption. In other words, there is proposed an optimized solution for the network to provision to the UE of a minimum set of information related to (PDSCH) transmit power change, which is based on the UE's need for such information, and more specifically based on a UE's indication related to transmit power change range or transmit power change rate which the UE can/cannot cope with. This allows to minimize the provided information from the network to the UE only to those cases where it is necessary.

FIG. 3 depicts an example method. The method may be computer-implemented. The method may be performed by a user equipment, such as the UE 120. Although DL communication may be used as an example in the following, the method is applicable to communication between any devices, such as to D2D communication and to UL communication.

As shown in FIG. 3, the UE 120 in step 300 determines whether or not a change indication from a gNB 110 (or in general from a device that is transmitting to the UE 120) is preferred when transmit power at the gNB 110 changes in a transmission to the UE 120, and in step 302 provides, to the gNB 110, information of whether or not the change indication is preferred.

The determination may be based for example on the resolution of the employed ADC which determines its dynamic range, the employed AGC and algorithms used to control the desired signal level at the ADC avoiding the sub-optimal regimes of the ADC (quantisation error and saturation error). In one example, the information is a single bit indicating with one bit value that a change indication is preferred and with another bit value that a change indication is not preferred.

The change in transmit power may refer to changes in transmit power used in e.g. adjacent PDSCH transmissions, or it can refer to how much the upcoming transmission's transmit power varies from some predefined or configured transmit power level.

In an embodiment, the amount of change in the transmit power of a given transmission may be determined with respect to configured physical downlink shared channel (PDSCH) transmit power. In an embodiment this configured Tx power level may be RRC signalled and/or MAC CE signalled and/or indicated as part of system information blocks (SIB).

In one embodiment, the amount of change in the transmit power of a given transmission may be determined with respect to the transmit power used in previous transmission to the UE 120. In an embodiment, it is prerequisite that the previous transmission has been acknowledged by the UE to the gNB.

In an embodiment the change indication is preferred whenever the gNB changes the transmit power (no matter how little) the gNB uses for transmissions to the UE, and the UE in such cases does send the information of the preference. However, in some embodiments the UE does not need or prefer to receive any change indication from the gNB, no matter how much the gNB changes the transmit power.

In an embodiment, the information sent to the gNB serves as a capability indication of the UE indicating its capability to receive such change indication(s) from the gNB.

In an embodiment, the information is transmitted in UE capability message to the gNB 110. In another embodiment, the information is transmitted in a UE assistance information message to the gNB. In an embodiment, the information is transmitted as RRC or MAC CE message.

In an embodiment the UE 120 may dynamically change the determination result and resend such information to the gNB 110. Such re-determination may take place for example based on detection or prediction of higher/too high likelihood of incurring in ADC's sub-optimal regions (e.g. saturation and/or quantization errors).

In an embodiment, the UE may in an optional step 304 further provide additional information related to the preference of receiving the change indication. This additional information may comprise e.g. one of an acceptable range or rate of Tx power change. In such case, the request/preference for power change indication can also include for which range or rate of the power change, the UE needs such indication. Within such range/rate, the UE may be able to cope with the power change based on own logic. These are considered in more details next.

In an embodiment, the UE may determine an acceptable range of transmit power change, and provide, to the gNB 110 as part of the information, a range indication indicating the acceptable range. The acceptable range, as well as the acceptable rate (described later) may provide an advantage that the change indication is sent only in certain cases, not always or never. For example, no change indication is preferred (and is thus not transmitted by the gNB) when change in transmit power is within the acceptable range, and the change indication is preferred (and is thus transmitted from the gNB) when the change in transmit power exceeds the acceptable range.

The acceptable range is based on a predetermined at least one threshold defining at least one of an upper and lower limit for the transmit power. The range indication may consequently indicate the at least one threshold (or both) to the gNB. In an embodiment the acceptable range may be defined based on absolute power change. E.g. when the Tx power exceeds +X dB (as an upper limit)/−Y (as a lower limit) dB compared to certain level, then the change indication is preferred. Otherwise not. Values for X and Y may be the same or different.

An embodiment utilizing such acceptable range is shown in FIG. 4A, which illustrates transmit power of six adjacent PDSCH transmissions 400-410. When the transmit power is within the limits set by the upper and the lower thresholds, no indication is sent. This is the case for transmissions 400, 404, 406 and 410. When the transmit power exceeds limits set by the upper and the lower thresholds, an indication is sent. This is the case for transmissions 402 and 408. In this example embodiment, the amount of change in the transmit power is determined with respect to a default Tx power, which may be e.g. RRC configured PDSCH Tx power level, or some other semi-static Tx power level.

As an example with reference to FIG. 4A, let us assume that the current/configured/predefined Tx power level is 40 dBm. Then, in one example, a tolerated range may be e.g. +/−5 dB, and this defines the relative change compared to 40 dBm tolerated per transmission.

Figures 4B, 4C:
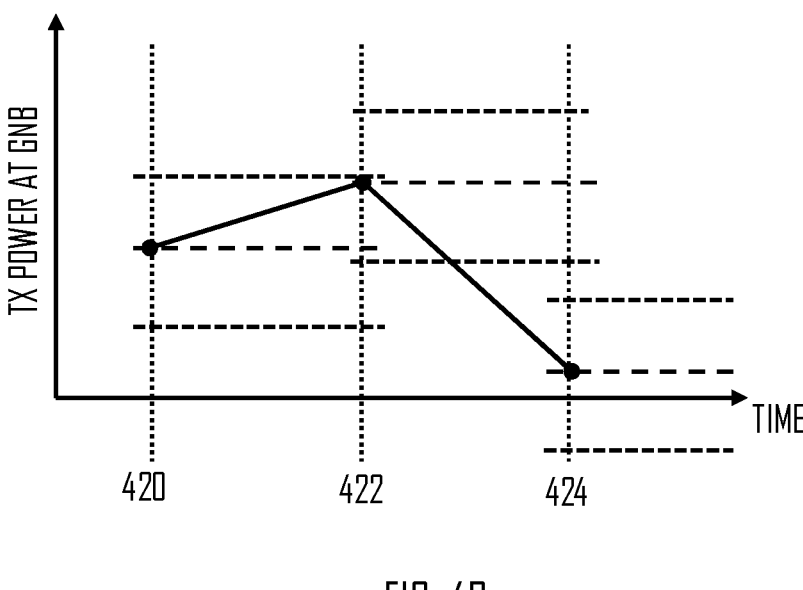

In an embodiment, the comparison can be made against the transmit power used for a previous transmission. This is shown in FIG. 4B. As illustrated, the comparison level shown with a long-dashed lines changes dynamically to the Tx power level of the previous transmission. And the upper and lower limits shown by the short-dashed lines adapt similarly with respect to the comparison level. In this example, the change indication is transmitted prior to a transmission of message 424 because the TX power used for transmissions 422 and 424 vary more than is acceptable. However, for transmission 422, there is no need to send the change indication because the change in transmit power from transmission 420 to transmission 422 is less than defined by the upper limit.

In an embodiment, the UE determines an acceptable rate of transmit power change, and provides, to the gNB 110 as part of the information, a rate indication indicating the acceptable rate. In this case, no change indication is preferred (and is thus not transmitted by the gNB) when change in transmit power is within the acceptable rate, and the change indication is preferred (and is thus not transmitted by the gNB) when the change rate in transmit power exceeds the acceptable rate.

In an embodiment, the acceptable rate is based on predetermined at least one threshold defining at least one of an upper and lower limit for the transmit power change within a predetermined time window, wherein the rate indication indicates the at least one threshold (or both) to the gNB. The predetermined time limit may be preconfigured. In an embodiment the acceptable rate may be defined based on Tx power change rate. E.g. in case of power increase, when the Tx power change exceed+X dB/ms (or dB/time unit) compared to certain level (e.g. the previous transmission), then the change indication is preferred. Or, in case of power decrease, when the power change rate exceeds-Y dB/ms (or dB/time unit), then the change indication is preferred. Otherwise not. Values for X and Y may be the same or different.

This is shown in FIG. 4C. Since the limits may be tied to change in time, the threshold limits may not be horizontal lines (as was the case in FIGS. 4A and 4B), but more Tx power variation is allowed when more time has passed. In FIG. 4C, the change indication is preferred and thus sent to the UE prior to transmission 432 but not before transmission 434. Even if the absolute change in transmit power is higher between transmissions 432 and 434, than between transmissions 430 and 432, the time between transmissions 432 and 434 is also longer, which in this acceptable rate example allows for more change in transmit power without the gNB having to send the change indication.

As an example with reference to FIG. 4C, let us assume that the current Tx power level of previous transmission is 40 dBm. Then, in one example, a tolerated rate of change in time may be e.g. +/−5 dB per ms. This may define the total change compared to 40 dBm tolerated within 1 ms (i.e. within the predetermined time window, which can be something else: e.g. 1 or a predefined number of slot(s), or 1 or a predefined number of subframe(s), or 1 or a predefined number of radio frame(s), just to name a few non-limiting examples).

In an embodiment, shown with reference numeral block 306 in FIG. 3, the information indicates to the gNB 110 that the UE 120 does not prefer to receive the change indication from the gNB 110. In such case, the UE 120 performs a reception of a transmission from the gNB 110, wherein the transmit power of the downlink transmission may have been changed without the UE 120 receiving a change indication. In such case the UE may refrain from adjusting a gain setting at the UE 120 in an ADC operation at least based on the change in the transmit power. If the ADC of the UE is of high quality, the UE may cope with receiving the DL transmission even if the transmit power is changed and even if the UE has not adjusted the gain setting level.

In an embodiment, shown with reference numeral block 308 in FIG. 3, the information indicates to the gNB 110 that the UE 120 prefers to receive a change indication from the gNB 110. In this case, the UE 120 receives the change indication from the gNB 110 (in cases where the transmit power is changes at the gNB, possibly in view of the acceptable change/rate). Thereafter, the UE may adjust a gain setting in an ADC operation based on the received change indication, and perform a reception of a transmission from the gNB 110 based on the adjusted gain setting. This may allow the ADC of the UE to work properly and a successful decoding of the DL transmission may be more likely.

It is to be noted that a change in the received power level can be due to various factors such as fading, shadowing, mobility, and the UE may not be able to distinguish which is the cause. However, the UE behaviour that is proposed is that the UE knows to adjust of the AGC set point (of the ADC operation when receiving a PDSCH transmission) related to a transmit power change, based on the network's change indication of power change. Alternatively, the UE may not adjust the AGC set point based on the transmit power change, if no network indication of power change is received. Note that the issue is that the UE adjusts the gain setting based on or related to the received change indication. The UE may change the AGC set point also due to the other factors (fading, shadowing, mobility), which are not related to the received change indication.

Figure 5:
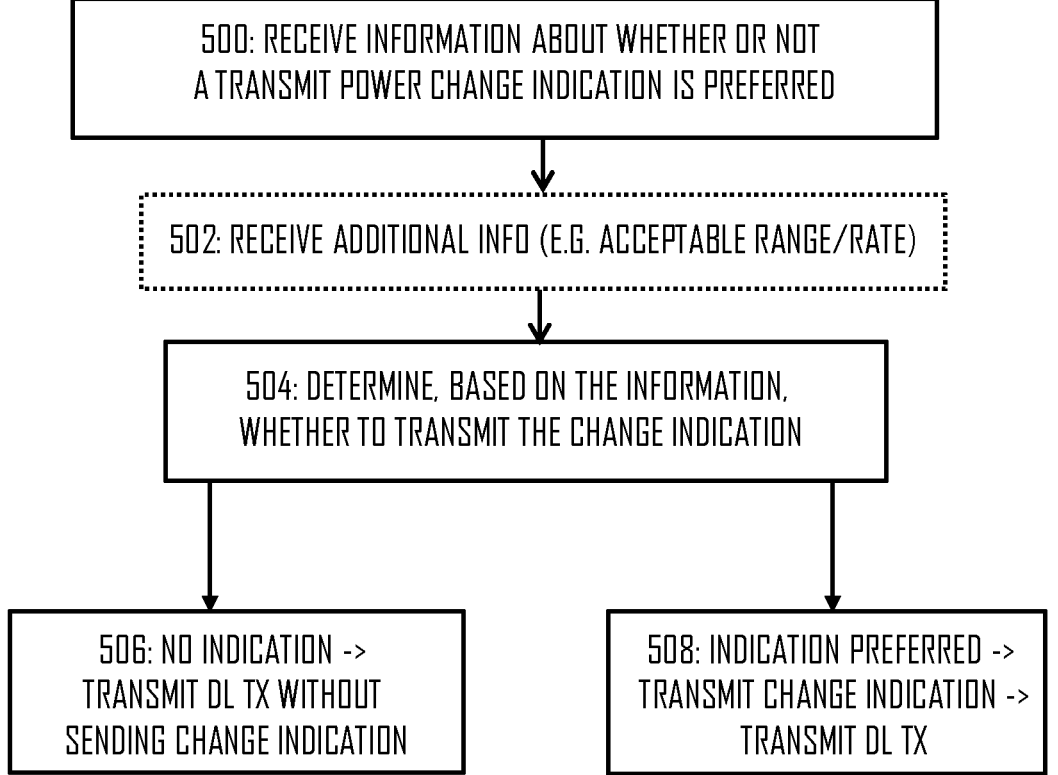

FIG. 5 depicts an example method. The method may be computer-implemented. The method may be performed by a network node, such as the gNB 110. As shown in FIG. 5, the gNB 110 in step 500 receives, from a UE 120, information of whether or not the UE 120 prefers to receive a change indication from the gNB 110 when transmit power at the gNB 110 changes in a transmission to the UE 120. In step 502, the gNB 110 may further receive the additional information (possibly together with the information of step 500), wherein the additional information may comprise e.g. the acceptable range or rate, as described above. In step 504 the gNB 110 determines, based on the received information, whether or not to transmit the change indication to the UE 120 when transmit power of the transmission to the UE 120 is changed. Then, the gNB 110 may, based on the determining, either refrain from transmitting the change indication in step 506 prior to transmitting the corresponding DL transmission, or transmit the change indication in step 508.

As explained, in an embodiment, the network change indication is provided based on the UE's indicated acceptable range or rate. However, in another example, the network indication is provided based on standardized range(s) or rate(s), which may depend on the UE type and/or capabilities, which may assume certain standard ADC/AGC performance. These standardized ranges may be preconfigured to the gNB 110, and thus the additional information of step 502 is not needed.

In an embodiment, the change indication, if determined to be sent, is transmitted as one of: downlink control indication (DCI) or medium access control control element (MAC CE).

In an embodiment related to transmitting the change indication in DCI, the gNB 110 may transmit the change indication in a scheduling DCI, if cross-slot scheduling is configured and used, to allow the UE to decode and use the received change indication for reception of the transmission that is scheduled in the scheduling DCI.

In an embodiment, related to transmitting the change indication in DCI, the gNB 110 may transmit the change indication in a dedicated DCI sent at least one slot (or a predefined number of slots) before the PDSCH transmission which is sent with the changed power, to allow the UE to decode and use the received change indication for reception of the transmission.

Figure 6:
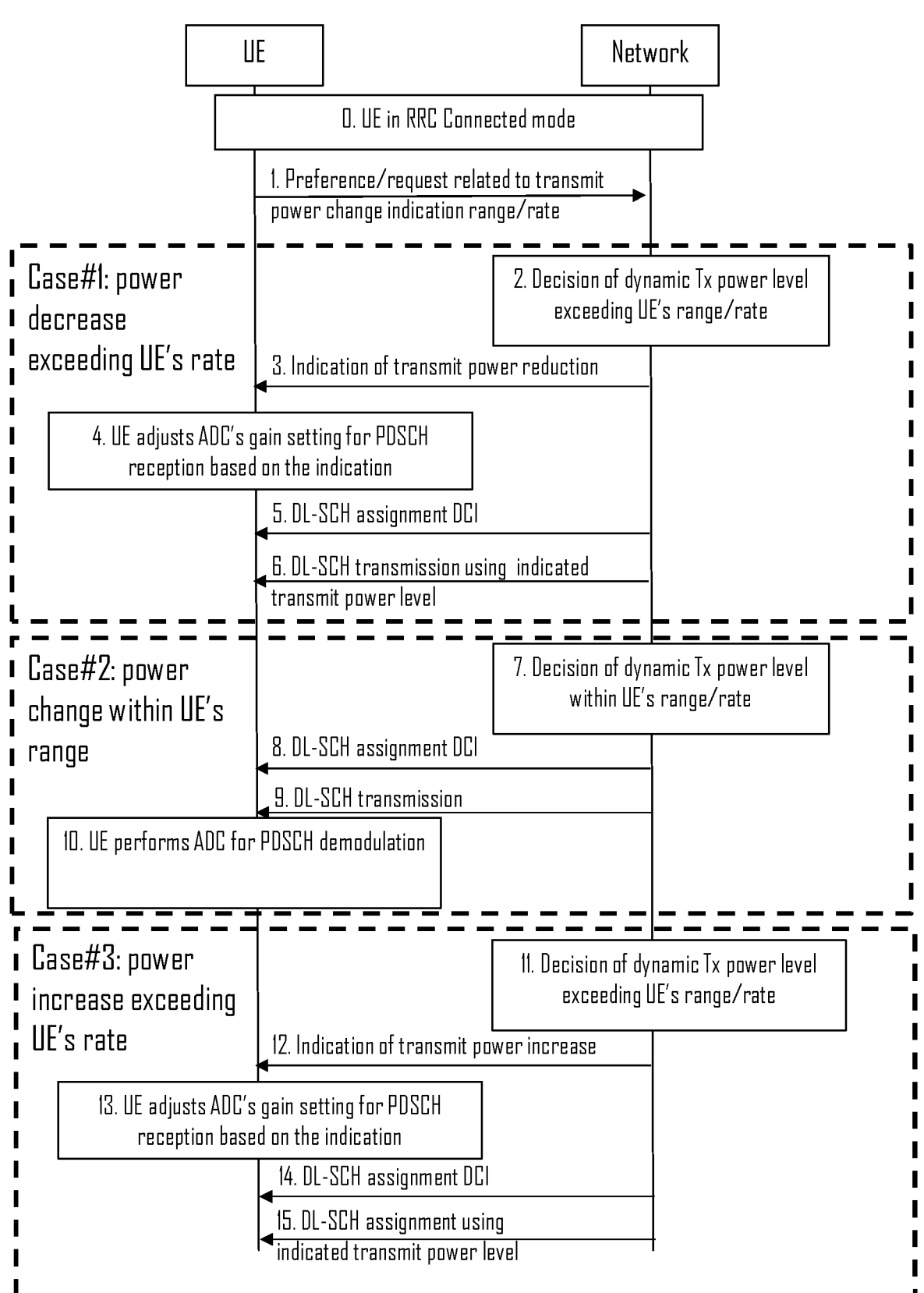
FIG. 6 shows signaling flow diagram, according to an embodiment.
Figure 7:
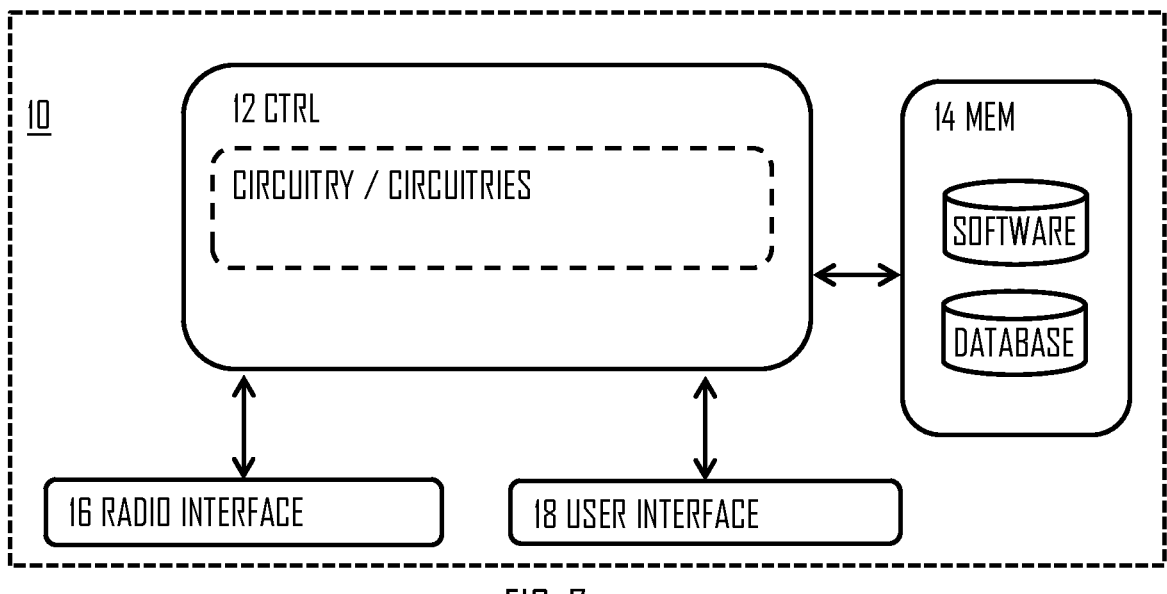
FIGS. 7 and 8 illustrate apparatuses, according to some embodiments.
Figure 8:
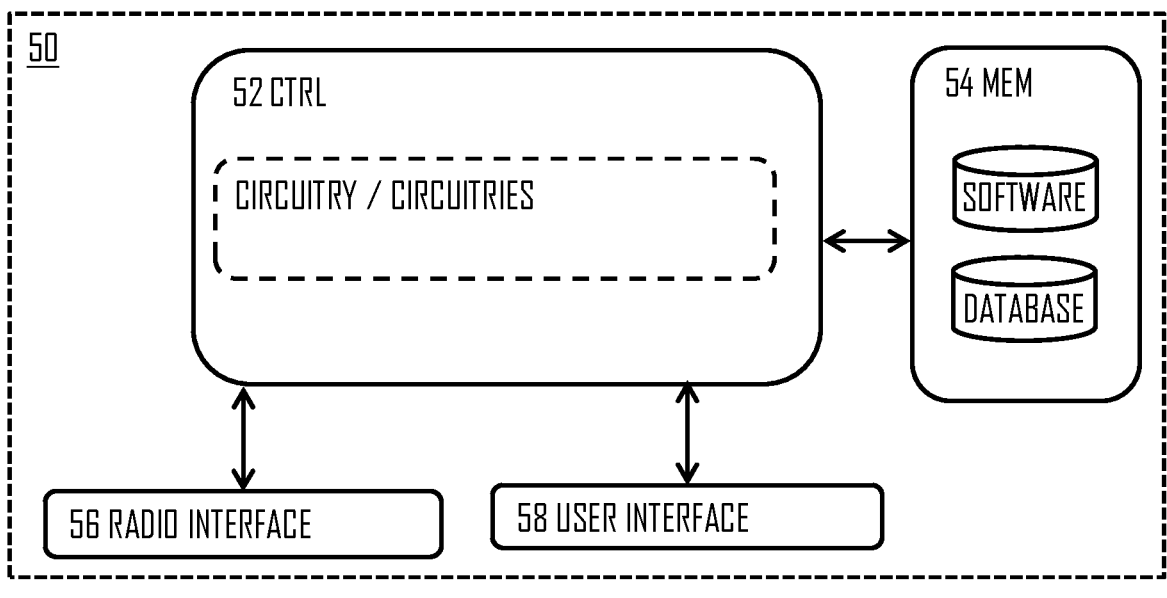

FIG. 6 shows a signaling flow diagram between a first device (such as the UE 120) and another device (such as the gNB 110). In step 0, the UE is in RRC connected mode with the gNB. In step 1 the UE sends, to the gNB, information regarding the preference of the change indication from the gNB when Tx power is changed. This may comprise the range or rate related information, as discussed.

The figure shows for case #1 steps 2 to 6. In step 2, the gNB determines that the Tx power change (decrease of Tx power in this case) that is to be applied to the next DL transmission to the UE exceeds the indicated range/rate (which may be UE specific). Consequently, in step 3, the gNB sends the change indication to the UE. Next the UE may adjust its ADC for PDSCH reception based on the indication in step 4. The gNB may schedule the next transmission to the UE in step 5, and then in step 15 the transmission of the scheduled PDSCH takes place in step 6, which is received with adjusted ADC at the UE. The order of steps 4 and 5 may be different.

The figure shows for case #2 steps 7 to 10. In step 7, the gNB determines that the Tx power change that is to be applied to the next DL transmission to the UE is within the indicated range/rate (which may be UE specific). Consequently, in step 8 the gNB may schedule the next transmission to the UE without sending any change indication, and in step 9 the transmission takes place. The UE may then in step 10 perform reception of the scheduled DL transmission without adjusting ADC.

The figure shows for case #3 steps 11 to 15. In step 11, the gNB determines that the Tx power change (increase of Tx power in this case) that is to be applied to the next DL transmission to the UE exceeds the indicated range/rate (which may be UE specific). Consequently, in step 12, the gNB sends the change indication to the UE. Next the UE may adjust its ADC for PDSCH reception based on the indication in step 13. The gNB may schedule the next transmission to the UE in step 14, and then in step 15 the transmission of the scheduled PDSCH takes place, which is received with adjusted ADC at the UE. The order of steps 13 and 14 may be different.

It is noted that in this Figure the change indication is transmitted as a separate control channel (PDCCH) message (see steps 3 and 12). In some other embodiments it could be merged in the scheduling DCI of steps 5 and 14.

An embodiment, as shown in FIG. 9, provides an apparatus 10 comprising a control circuitry (CTRL) 12, such as at least one processor, and at least one memory 14 storing instructions that, when executed by the at least one processor, cause the apparatus at least to carry out any one of the above-described processes. In an example, the at least one memory and the computer program code (software), are configured, with the at least one processor, to cause the apparatus to carry out any one of the above-described processes. The memory may be implemented using any suitable data storage technology, such as semiconductor-based memory devices, flash memory, magnetic memory devices and systems, optical memory devices and systems, fixed memory and removable memory. The memory may comprise a database for storing data.

In an embodiment, the apparatus 10 may comprise the terminal device of a communication system, e.g. a user terminal (UT), a computer (PC), a laptop, a tabloid computer, a cellular phone, a mobile phone, a communicator, a smart phone, a palm computer, a mobile transportation apparatus (such as a car), a household appliance, or any other communication apparatus, commonly called as UE in the description. Alternatively, the apparatus is comprised in such a terminal device. Further, the apparatus may be or comprise a module (to be attached to the UE) providing connectivity, such as a plug-in unit, an "USB dongle", or any other kind of unit. The unit may be installed either inside the UE or attached to the UE with a connector or even wirelessly.

In an embodiment, the apparatus 10 is or is comprised in the UE 120. The apparatus may be caused to execute some of the functionalities of the above described processes, such as the steps of FIG. 3.

The apparatus may further comprise a radio interface (TRX) 16 comprising hardware and/or software for realizing communication connectivity according to one or more communication protocols. The TRX may provide the apparatus with communication capabilities to access the radio access network, for example.

The apparatus may also comprise a user interface 18 comprising, for example, at least one keypad, a microphone, a touch display, a display, a speaker, etc. The user interface may be used to control the apparatus by the user. The control circuitry 12 may comprise relevant circuitry/ies for performing the functions, according to any of the embodiments.

An embodiment, as shown in FIG. 10, provides an apparatus 50 comprising a control circuitry (CTRL) 52, such as at least one processor, and at least one memory 54 storing instructions that, when executed by the at least one processor, cause the apparatus at least to carry out any one of the above-described processes. In an example, the at least one memory and the computer program code (software), are configured, with the at least one processor, to cause the apparatus to carry out any one of the above-described processes. The memory may be implemented using any suitable data storage technology, such as semiconductor-based memory devices, flash memory, magnetic memory devices and systems, optical memory devices and systems, fixed memory and removable memory. The memory may comprise a database for storing data.

In an embodiment, the apparatus 50 may be or be comprised in a network node, such as in gNB/gNB-CU/gNB-DU of 5G. In an embodiment, the apparatus is or is comprised in the network node 110. The apparatus may be caused to execute some of the functionalities of the above described processes, such as the steps of FIG. 5.

In an embodiment, a CU-DU (central unit-distributed unit) architecture is implemented. In such case the apparatus 50 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the radio node may be stand-alone apparatuses communicating with each other via a radio path or via a wired connection. Alternatively, they may be in a same entity communicating via a wired connection, etc. The edge cloud or edge cloud server may serve a plurality of radio nodes or a radio access networks. In an embodiment, at least some of the described processes may be performed by the central unit. In another embodiment, the apparatus may be instead comprised in the distributed unit, and at least some of the described processes may be performed by the distributed unit. In an embodiment, the execution of at least some of the functionalities of the apparatus 50 may be shared between two physically separate devices (DU and CU) forming one operational entity. Therefore, the apparatus may be seen to depict the operational entity comprising one or more physically separate devices for executing at least some of the described processes. In an embodiment, the apparatus controls the execution of the processes, regardless of the location of the apparatus and regardless of where the processes/functions are carried out.

The apparatus may further comprise communication interface (TRX) 56 comprising hardware and/or software for realizing communication connectivity according to one or more communication protocols. The TRX may provide the apparatus with communication capabilities to access the radio access net-work, for example. The apparatus may also comprise a user interface 58 comprising, for example, at least one keypad, a microphone, a touch display, a display, a speaker, etc. The user interface may be used to control the apparatus by the user. The control circuitry 52 may comprise relevant circuitry/ies for performing the functions, according to any of the embodiments.

In an embodiment, an apparatus carrying out at least some of the embodiments described comprises at least one processor and at least one memory including a computer program code, wherein the at least one memory and the computer program code are configured, with the at least one processor, to cause the apparatus to carry out the functionalities according to any one of the embodiments described. According to an aspect, when the at least one processor executes the computer program code, the computer program code causes the apparatus to carry out the functionalities according to any one of the embodiments described. According to another embodiment, the apparatus carrying out at least some of the embodiments comprises the at least one processor and at least one memory including a computer program code, wherein the at least one processor and the computer program code perform at least some of the functionalities according to any one of the embodiments described. Accordingly, the at least one processor, the memory, and the computer program code form processing means for carrying out at least some of the embodiments described. According to yet another embodiment, the apparatus carrying out at least some of the embodiments comprises a circuitry including at least one processor and at least one memory including computer program code. When activated, the circuitry causes the apparatus to perform the at least some of the functionalities according to any one of the embodiments described.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry.

A term non-transitory, as used herein, is a limitation of the medium itself (i.e. tangible, not a signal) as opposed to a limitation on data storage persistency (e.g. RAM vs. ROM).

As used herein the term "means" is to be construed in singular form, i.e. referring to a single element, or in plural form, i.e. referring to a combination of single elements. Therefore, terminology "means for [performing A, B, C]", is to be interpreted to cover an apparatus in which there is only one means for performing A, B and C, or where there are separate means for performing A, B and C, or partially or fully overlapping means for performing A, B, C. Further, terminology "means for performing A, means for performing B, means for performing C" is to be interpreted to cover an apparatus in which there is only one means for performing A, B and C, or where there are separate means for performing A, B and C, or partially or fully overlapping means for performing A, B, C.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Following is a list of some aspects of the invention.

According to a first aspect, there is provided a method performed by a first device, the method comprising: determining whether or not a change indication from a second device is preferred when transmit power at the second device changes in a transmission to the first device; and providing, to the second device, information of whether or not the change indication is preferred.

Various embodiments of the first aspect may comprise at least one feature from the following bulleted list:

determining an acceptable range of transmit power change, wherein no change indication is preferred when change in transmit power is within the acceptable range, and wherein the change indication is preferred when the change in transmit power exceeds the acceptable range; and providing, to the second device as part of the information, a range indication indicating the acceptable range.

wherein the acceptable range is based on a predetermined at least one threshold defining at least one of an upper and lower limit for the transmit power, and wherein the range indication indicates the at least one threshold.

determining an acceptable rate of transmit power change, wherein no change indication is preferred when change in transmit power is within the acceptable rate, and a wherein the change indication is preferred when the change rate in transmit power exceeds the acceptable rate; and providing, to the second device as part of the information, a rate indication indicating the acceptable rate.

wherein the acceptable rate is based on predetermined at least one threshold defining at least one of an upper and lower limit for the transmit power change within a predetermined time window, wherein the rate indication indicates the at least one threshold.

wherein the information is transmitted in a user equipment capability message.

wherein the information is transmitted in a user equipment assistance information message.

wherein the information indicates to the second device that the first device does not prefer to receive the change indication from the second device, and method further comprises performing a reception of a transmission from the second device, wherein the transmit power of the downlink transmission is changed without the first device receiving the change indication and wherein an adjustment of a gain setting at the first device in an analog-to-digital conversion (ADC) operation based on the change in the transmit power does not occur.

wherein the information indicates to the second device that the first device prefers to receive the change indication from the second device, and the method further comprises: receiving the change indication from the second device; adjusting a gain setting in an analog-to-digital conversion (ADC) operation based on the received change indication; and performing a reception of a transmission from the second device based on the adjusted gain setting.

According to a second aspect, there is provided a method performed by a second device, the method comprising: receiving, from a first device, information of whether or not the first device prefers to receive a change indication from the second device when transmit power at the second device changes in a transmission to the first device; and determining, based on the received information, whether or not to transmit the change indication to the first device when transmit power of the transmission to the first device is changed Various embodiments of the second aspect may comprise at least one feature from the following bulleted list:

determining whether or not to transmit the change indication to the first device based on whether the change in the transmit power exceeds an acceptable range or an acceptable rate.

the received information comprises the acceptable range of transmit power change, wherein no change indication is preferred when the change in transmit power is within the acceptable range, and wherein the change indication is preferred when the change in transmit power exceeds the acceptable range.

the received information comprises the acceptable rate of transmit power change, wherein no change indication is preferred when the change in transmit power is within the acceptable rate, and wherein the change indication is preferred when the change in transmit power exceeds the acceptable rate.

wherein the acceptable range or the acceptable rate is predefined and based on the type of the first device.

wherein amount of change in the transmit power of a given transmission is determined based on a comparison between the transmit power of the given transmission to the first device and at least one of: configured physical downlink shared channel (PDSCH) transmit power or transmit power used in previous transmission to the first device.

wherein the change indication, if transmitted, is transmitted as one of: downlink control indication (DCI) or medium access control control element (MAC CE).

According to a third aspect, there is provided a first device, comprising: at least one processor; and at least one memory storing instructions that, when executed by the at least one processor, cause the first device at least to: determine whether or not a change indication from a second device is preferred when transmit power at the second device changes in a transmission to the first device; and provide, to the second device, information of whether or not the change indication is preferred. Various embodiments of the third aspect may comprise at least one feature from the bulleted list under the first aspect.

According to a fourth aspect, there is provided a second device comprising: at least one processor; and at least one memory storing instructions that, when executed by the at least one processor, cause the apparatus at least to: receive, from a first device, information of whether or not the first device prefers to receive a change indication from the second device when transmit power at the second device changes in a transmission to the first device; and determine, based on the received information, whether or not to transmit the change indication to the first device when transmit power of the transmission to the first device is changed. Various embodiments of the fourth aspect may comprise at least one feature from the bulleted list under the second aspect.

According to a fifth aspect, there is provided a computer program product embodied on a distribution medium and comprising program instructions which, when executed by an apparatus, cause the apparatus to carry out the method according to the first aspect.

According to a sixth aspect, there is provided a computer program product embodied on a distribution medium and comprising program instructions which, when executed by an apparatus, cause the apparatus to carry out the method according to the second aspect.

According to a seventh aspect, there is provided a computer program product comprising program instructions which, when executed by an apparatus, cause the apparatus to carry out the method according to the first aspect.

According to an eight aspect, there is provided a computer program product comprising program instructions which, when executed by an apparatus, cause the apparatus to carry out the method according to the second aspect.

According to a ninth aspect, there is provided an apparatus, comprising means for performing the method according to the first aspect, and/or means configured to cause the apparatus to perform the method according to the first aspect.

According to a tenth aspect, there is provided an apparatus, comprising means for performing the method according to the second aspect, and/or means configured to cause the apparatus to perform the method according to the second aspect.

According to an eleventh aspect, there is provided computer implemented system, comprising: a server and at least one radio node; and at least one processor and at least one memory storing instructions that, when executed by the at least one processor, cause the system at least to carry out the method according to the first aspect and/or the method according to the second aspect.

According to a twelfth aspect, there is provided computer implemented system, comprising: one or more processors; at least one data storage, and one or more computer program instructions to be executed by the one or more processors in association with the at least one data storage for carrying out the method according to the first aspect and/or the method according to the second aspect.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A first device, comprising:
at least one processor; and
at least one memory storing instructions that, when executed by the at least one processor, cause the first device at least to:
determine, based on a resolution of an analog-to-digital converter (ADC) and operation of an automatic gain control (AGC) loop of the first device, whether or not a change indication from a second device is preferred when physical downlink shared channel (PDSCH) transmit power at the second device changes in a transmission to the first device;
provide, to the second device, information of whether or not the change indication is preferred, wherein the information comprises a single-bit flag transmitted in a radio resource control (RRC) capability or assistance information message; and
in response to the determination, further provide an acceptable range of transmit power change expressed as at least one of an upper or lower threshold in decibels (dB) relative to a configured PDSCH transmit power level signaled via RRC, wherein no change indication is preferred when the change in transmit power is within the acceptable range, and wherein the change indication is preferred when the change in transmit power exceeds the acceptable range, wherein the acceptable range of transmit power change is defined as ±5 dB relative to a configured PDSCH transmit power level of 40 dBm signaled via radio resource control (RRC); and
based on the change indication being received from the second device for a PDSCH transmission exceeding the ±5 dB threshold, adjust an AGC set point of the ADC prior to demodulating the PDSCH transmission.

2. The first device of claim 1, wherein the information is alternatively transmitted in a medium access control control element (MAC CE) message.

3. The first device of claim 2, wherein the acceptable range is determined relative to a transmit power of a previous acknowledged PDSCH transmission to the first device, and wherein the threshold is dynamically updated based on the previous transmit power.

4. The first device of claim 3, wherein the first device is further caused to determine an acceptable rate of transmit power change expressed as a maximum of ±5 dB per millisecond within a one-millisecond window, and provide to the second device a rate indication indicating the acceptable rate.

5. The first device of claim 4, wherein the first device dynamically re-determines and re-transmits the single-bit flag and the acceptable range upon detecting or predicting that the ADC is at risk of entering quantization or saturation error regimes.

6. The first device of claim 5, wherein, when the single-bit flag indicates that no change indication is preferred, the first device is caused to refrain from adjusting the AGC set point in response to transmit power changes and to perform reception of the PDSCH transmission without AGC modification.

7. The first device of claim 6, wherein the second device comprises a next generation Node B (gNB), and the first device comprises a user equipment (UE) configured for demodulation of PDSCH transmissions in a 5G NR network.

8. A system comprising:
a first device;
at least one processor; and
at least one memory storing instructions that, when executed by the at least one processor, cause the first device at least to:
determine, based on a resolution of an analog-to-digital converter (ADC) and operation of an automatic gain control (AGC) loop of the first device, whether or not a change indication from a second device is preferred when physical downlink shared channel (PDSCH) transmit power at the second device changes in a transmission to the first device;
provide, to the second device, information of whether or not the change indication is preferred, wherein the information comprises a single-bit flag transmitted in a radio resource control (RRC) capability or assistance information message; and
in response to the determination, further provide an acceptable range of transmit power change expressed as at least one of an upper or lower threshold in decibels (dB) relative to a configured PDSCH transmit power level signaled via RRC, wherein no change indication is preferred when the change in transmit power is within the acceptable range, and wherein the change indication is preferred when the change in transmit power exceeds the acceptable range, wherein the acceptable range of transmit power change is defined as ±5 dB relative to a configured PDSCH transmit power level of 40 dBm signaled via radio resource control (RRC); and
based on the change indication being received from the second device for a PDSCH transmission exceeding the ±5 dB threshold, adjust an AGC set point of the ADC prior to demodulating the PDSCH transmission.

9. The system of claim 8, wherein the information is alternatively transmitted in a medium access control control element (MAC CE) message.

10. The system of claim 9, wherein the acceptable range is determined relative to a transmit power of a previous acknowledged PDSCH transmission to the first device, and wherein the threshold is dynamically updated based on the previous transmit power.

11. The system of claim 10, wherein the first device is further caused to determine an acceptable rate of transmit power change expressed as a maximum of ±5 dB per millisecond within a one-millisecond window, and provide to the second device a rate indication indicating the acceptable rate.

12. The system of claim 11, wherein the first device dynamically re-determines and re-transmits the single-bit flag and the acceptable range upon detecting or predicting that the ADC is at risk of entering quantization or saturation error regimes.

13. The system of claim 12, wherein, when the single-bit flag indicates that no change indication is preferred, the first device is caused to refrain from adjusting the AGC set point in response to transmit power changes and to perform reception of the PDSCH transmission without AGC modification.

14. The system of claim 13, wherein the second device comprises a next generation Node B (gNB), and the first device comprises a user equipment (UE) configured for demodulation of PDSCH transmissions in a 5G NR network.

15. A method comprising:
determining, based on a resolution of an analog-to-digital converter (ADC) and operation of an automatic gain control (AGC) loop of a first device, whether or not a change indication from a second device is preferred when physical downlink shared channel (PDSCH) transmit power at the second device changes in a transmission to the first device;
providing, to the second device, information of whether or not the change indication is preferred, wherein the information comprises a single-bit flag transmitted in a radio resource control (RRC) capability or assistance information message; and
in response to the determination, providing an acceptable range of transmit power change expressed as at least one of an upper or lower threshold in decibels (dB) relative to a configured PDSCH transmit power level signaled via RRC, wherein no change indication is preferred when the change in transmit power is within the acceptable range, and wherein the change indication is preferred when the change in transmit power exceeds the acceptable range, wherein the acceptable range of transmit power change is defined as ±5 dB relative to a configured PDSCH transmit power level of 40 dBm signaled via radio resource control (RRC); and
based on the change indication being received from the second device for a PDSCH transmission exceeding the ±5 dB threshold, adjusting an AGC set point of the ADC prior to demodulating the PDSCH transmission.

16. The method of claim 15, wherein the information is alternatively transmitted in a medium access control control element (MAC CE) message.

17. The method of claim 16, wherein the acceptable range is determined relative to a transmit power of a previous acknowledged PDSCH transmission to the first device, and wherein the threshold is dynamically updated based on the previous transmit power.

18. The method of claim 17, further comprising determining an acceptable rate of transmit power change expressed as a maximum of ±5 dB per millisecond within a one-millisecond window, and provide to the second device a rate indication indicating the acceptable rate.

19. The method of claim 18, dynamically re-determining and re-transmitting the single-bit flag and the acceptable range upon detecting or predicting that the ADC is at risk of entering quantization or saturation error regimes.

20. The method of claim 19, wherein, when the single-bit flag indicates that no change indication is preferred, the first device is caused to refrain from adjusting the AGC set point in response to transmit power changes and to perform reception of the PDSCH transmission without AGC modification.

\* \* \* \* \*